No. 801,192. PATENTED OCT. 3, 1905.
J. B. HOLLISTER.
DRAFT EQUALIZER.
APPLICATION FILED JAN. 16, 1905.
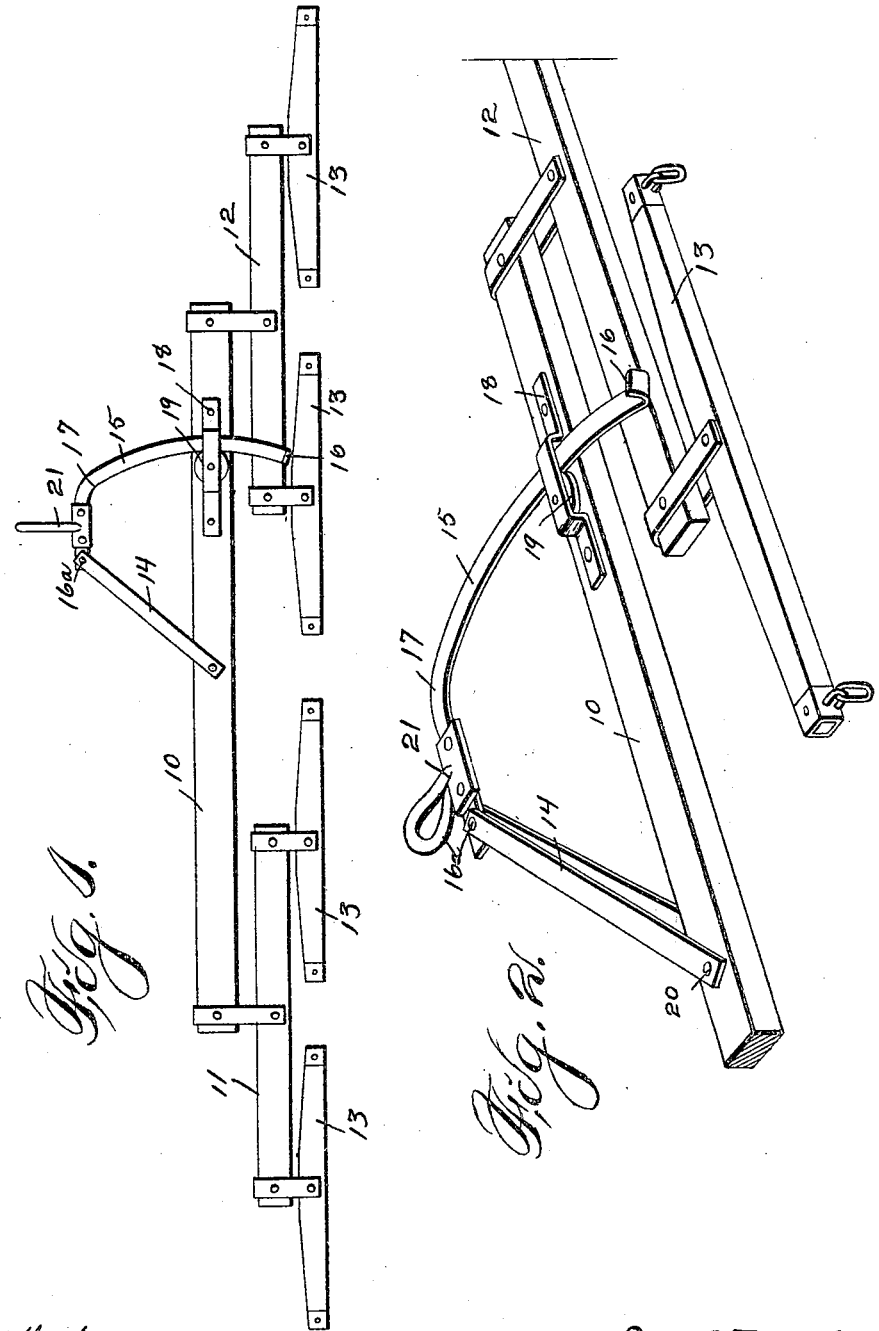

UNITED STATES PATENT OFFICE.

JOHN B. HOLLISTER, OF FORT DODGE, IOWA.

DRAFT-EQUALIZER.

No. 801,192.  Specification of Letters Patent.  Patented Oct. 3, 1905.

Application filed January 16, 1905. Serial No. 241,292.

*To all whom it may concern:*

Be it known that I, JOHN B. HOLLISTER, a citizen of the United States, residing at Fort Dodge, in the county of Webster and State of Iowa, have invented certain new and useful Improvements in Draft-Equalizers, of which the following is a specification.

The objects of my invention are to provide a draft-equalizer of simple, durable, and inexpensive construction which will throw three of the draft-animals to one side of the point of attachment of the draft device and one of the draft-animals at the other side of the point of attachment of the draft device.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 is a plan view of the complete draft-equalizer; and Fig. 2 is a detail perspective view of the equalizing portion of the device, showing the way in which it is attached to the evener.

Referring to the accompanying drawings, I have used the reference-numeral 10 to indicate the evener, having the doubletrees 11 and 12 pivoted to the ends of it. Each of these doubletrees 11 and 12 have two swingletrees 13 pivoted at their ends. Pivotally attached to the central portion of the evener 10 and above and below said evener is the two-part draft-bar 14, which has pivotally attached between its rear ends the guide-bar, said guide-bar having a limiting-stop at its forward end 16. This limiting-stop 16 is designed to limit the rearward movement of said guide relative to the evener 10. The guide extends from the pivot 16ª, which secures it to the two-part draft-bar 14 in a line substantially parallel with the evener 10, and then is bent forwardly at 17 and is curved to its forward end. This draft-bar extends through a holder 18, in which there is mounted a pulley 19, which is engaged by the inner curved portion of the bar 15 and is designed to prevent the draft-bar from being drawn toward the pivot 20 which secures the two-part draft-bar to the evener. Attached to the guide 15 at a point adjacent to the pivot 16ª is a connecting-piece 21, which forms a portion of the mechanism connecting the equalizer to a plow or other device. This pulley 19 limits the movement of the attachment-point relative to the pivot 20.

In practical operation and assuming that the equalizer is attached to a plow or other device and the draft-animals are attached to the swingletrees and the draft-animals are driven forwardly the animals will be kept in their relative positions by means of the draft-bar 14 and the guide 15, coacting with the roller 19, owing to the slight lateral movement of the draft-bar 14 and the guide 15 as said guide acts on the roller 19. The limiting-stop 16 prevents any possibility of the guide from being withdrawn through the opening between the holder 18 and the evener 10 in turning or in other use of the device.

Having thus described my invention, what I claim, and desire to secure by Letters Patent of the United States therefor, is—

1. In a device of the class described, an evener, a draft-bar pivoted to the evener at its central portion, a curved guide pivoted to the draft-bar, a roller secured to the evener and at one side of the draft-bar, designed to coact with the curved guide in operation, doubletrees secured to the ends of the evener, and means attaching the guide to a plow or other device.

2. In a device of the class described, an evener, a draft-bar pivoted to the evener at its central portion, a curved guide pivoted to the draft-bar, a roller secured to the evener and at one side of the draft-bar, designed to coact with the curved guide in operation, doubletrees secured to the ends of the evener, means attaching the guide to a plow or other device, and means for limiting the rearward movement of the curved guide.

3. In a device of the class described, an evener, a two-part draft-bar pivotally secured to the central portion of the evener at points above and below it, a curved guide pivotally secured between the rear ends of the draft-bar, having a forward end designed to limit its rearward movement, a holder through which the curved guide passes, a pulley in the holder designed to coact with the inner curved portion of the guide in operation, means for securing the guide to a plow or other device at a point adjacent to the pivotal connection between the draft-bar and the guide, and doubletrees secured to the ends of the evener.

JOHN B. HOLLISTER.

Witnesses:
H. M. HANCOCK,
JULIUS C. FULLON.